Figure 1:
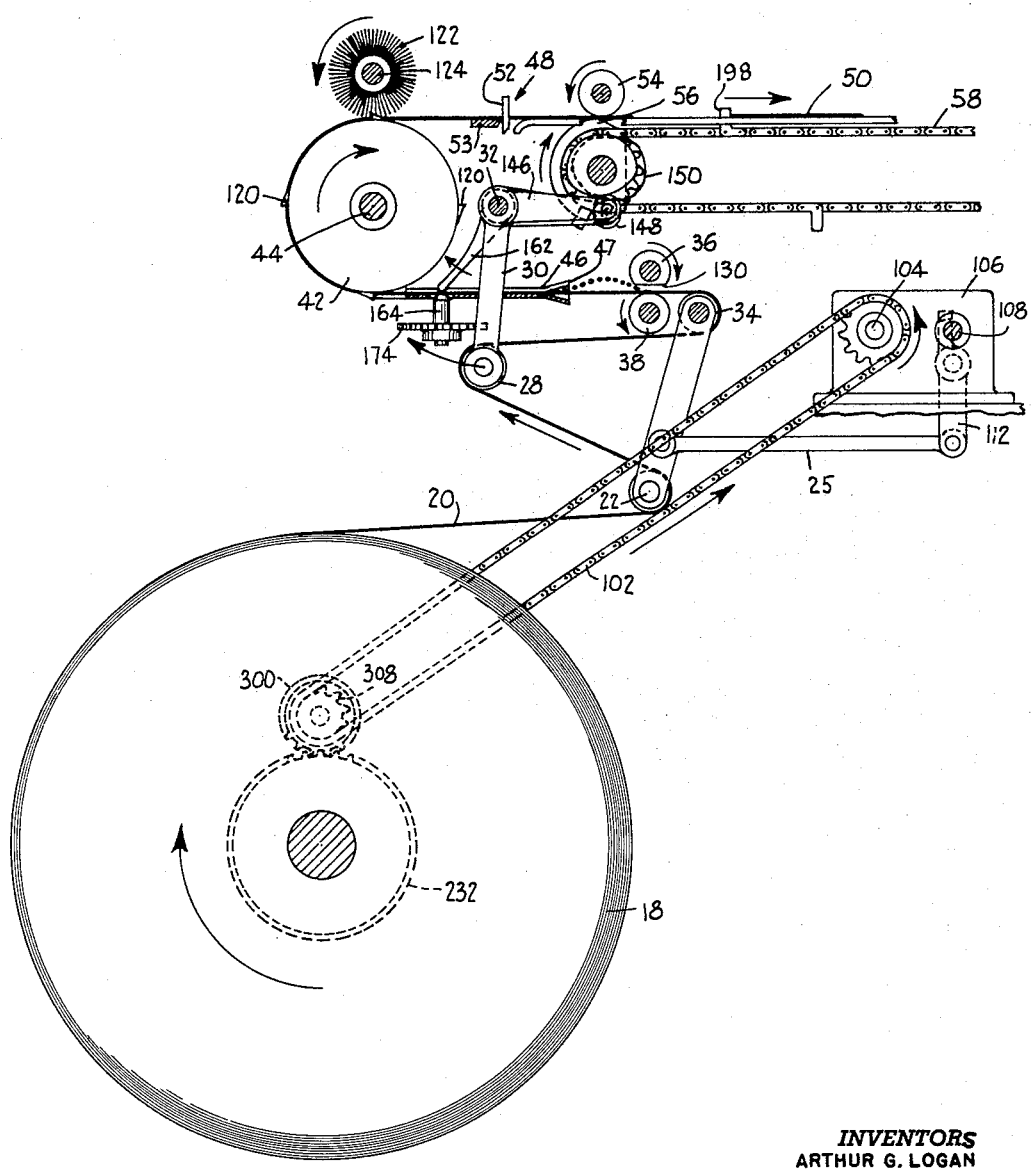

Oct. 26, 1965  A. G. LOGAN ETAL  3,213,726
WRAPPER FEEDING AND REGISTERING MECHANISM
Filed Sept. 30, 1960  8 Sheets-Sheet 1

INVENTORS
ARTHUR G. LOGAN
JOHN JACKSON
ROBERT J. OSSENKOP
BY
ATTORNEY

Oct. 26, 1965  A. G. LOGAN ETAL  3,213,726
WRAPPER FEEDING AND REGISTERING MECHANISM
Filed Sept. 30, 1960  8 Sheets-Sheet 5

INVENTORS
ARTHUR G. LOGAN
JOHN JACKSON
ROBERT J. OSSENKOP
BY
Murray Schaffer
ATTORNEY Oct. 26, 1965   A. G. LOGAN ETAL   3,213,726
WRAPPER FEEDING AND REGISTERING MECHANISM
Filed Sept. 30, 1960   8 Sheets-Sheet 6

INVENTORS
ARTHUR G. LOGAN
JOHN JACKSON
ROBERT J. OSSENKOP
BY
ATTORNEY

Oct. 26, 1965  A. G. LOGAN ETAL  3,213,726
WRAPPER FEEDING AND REGISTERING MECHANISM
Filed Sept. 30, 1960  8 Sheets-Sheet 8

*INVENTOR.*
ARTHUR G. LOGAN
JOHN JACKSON
ROBERT J. OSSENKOP

BY

ATTORNEY 3,213,726
WRAPPER FEEDING AND REGISTERING MECHANISM
Arthur G. Logan, North Merrick, and John Jackson, Brooklyn, N.Y., and Robert J. Ossenkop, Linden, N.J., assignors to American Machine & Foundry Company, a corporation of New Jersey
Filed Sept. 30, 1960, Ser. No. 59,685
8 Claims. (Cl. 83—23)

This invention relates to improvements in apparatus for wrapping packages or the like, and, in particular, to apparatus for feeding printed labels to cigarette packaging machines.

The improvement of the present invention is embodied in apparatus designed for use in conjunction with known types of packaging and wrapping machines; the objects of the present invention being, to feed labels from a substantially endless roll to said machines at high speeds, utilizing simple mechanisms and having great accuracy with substantially less manual effort and attention than heretofore possible.

As an example of a standard packaging and wrapping machine, attention is drawn to the No. 3–79 "Cigarette Packaging Machine" made by the American Machine and Foundry Company, which is extensively used by the cigarette industry and is well-known to those in the art. In this machine, and in others of similar operation, pre-cut blank labels are manually supplied to a storage hopper, from which the labels are fed individually through conveyor means to a wrapping station where they are turned about a partially completed inner-foil wrapped package of cigarettes. The efficiency and speed at which the wrapping machine operates depends in some measure upon the efficiency and speed at which the label blanks can be fed to it. The presently known apparatus is rather limited in this sense because of the difficulty in removing an individual blank from the hopper and in advancing the single blank to the wrapping machine in registered metered progression so that the printed matter on it is in correct position for folding. Other difficulties encountered, which hamper the efficiency and speed of the present apparatus are, the necessity for pre-cutting the label blanks to accurate size, storing the pre-cut labels, and manually supplying the same to the hopper.

It has long been known that feeding of labels to a wrapping machine can be best and most efficiently accomplished by "web feeding" and by automatically cutting and conveying an individual label from the web to the wrapping mechanism. This system of feeding is commonly used for the inner foil and cellophane wrappers of cigarette packages. However, because of certain significant factors, this system has not been applied to the feeding of printed labels. Unlike the feeding of the unprinted foil inner wrapping or cellophane outer wrapping, the printed label must be minutely sized, accurately positioned and correctly fed to the machine so that each finished package bears a label printed and positioned in exactly the same way as on every other package. These problems are accentuated by the fact that if the labels are supplied in a substantial endless web wound on a large reel, each label is in a relatively different position, not only from the preceding label, but from all other labels on the reel. As the reel or web decreases in size during feeding, the speed at which the reel rotates to feed individual labels to the cutter must be increased, in order for each label to maintain the same relative linear forward speed and position. Also, the positioning and registration of an individual label on a moving web, so that it could be accurately severed and fed to the wrapping machine, were grave problems. Until the present invention, the art was unable to overcome these problems resulting in the continued use of the slow, expensive, and inefficient operation described previously.

Accordingly, it is among the objects of the present invention to provide: (a) apparatus for reel or web feeding printed labels, (b) apparatus adapted for the presently used paper labels and variety of laminated or other types of labels as well as other forms and shapes thereof, (c) apparatus easily adapted and attached to the present type of wrapping machine without any undue cost for conversion, (d) apparatus increasing the speed and efficiency of the present wrapping machine, and (e) apparatus eliminating the preliminary steps of pre-cutting and storing of label blanks.

These objects, together with more specific objects, will become apparent from the description of the present invention which consists of certain constructions and combinations fully set forth herein. However, briefly, the invention provides a method of cutting pre-measured label blanks from a substantially endless web and feeding the blanks to a wrapping machine, comprising, mounting the web on a rotatable reel, continuously rotating the reel, feeding the web from the reel to a cutting station, sequentially registering the leading blank and conveying it to the wrapping machine, and continuously sensing web tension and the size of the web on the reel and varying the speed of rotation on the reel.

There is further provided apparatus for cutting pre-measured label blanks from a substantially endless web thereof and feeding the blanks to a wrapping machine, comprising means for rotatably mounting a reel from which the web is fed, means feeding the leading blank of the web to a cutting station, means for cutting the pre-measured blanks from the web, means for conveying the cut blanks to the wrapping machine and means sensing the size and tension of the web on the reel and for controlling the speed at which the web is fed to said cutting station.

Figure 2:
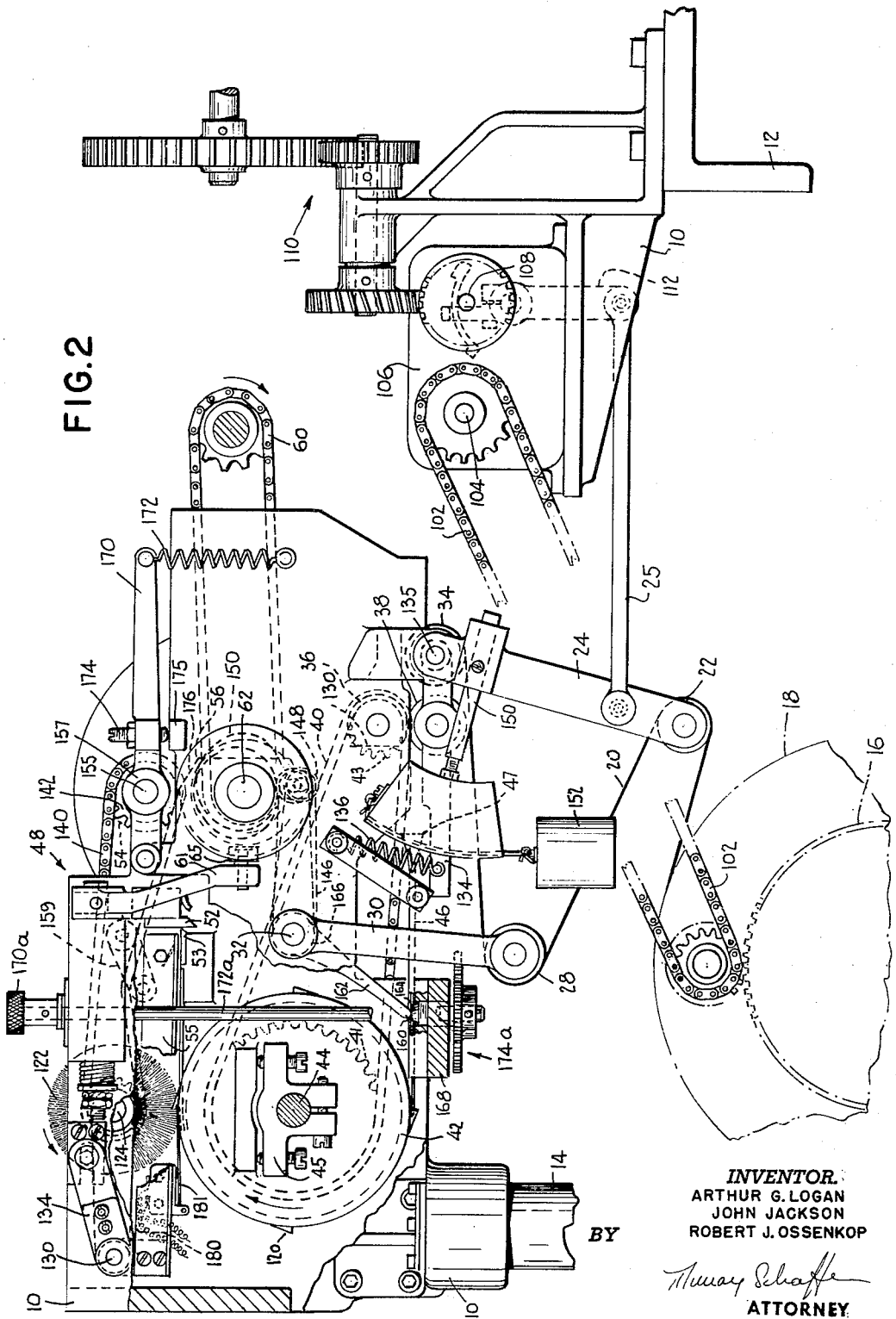
Figure 3:
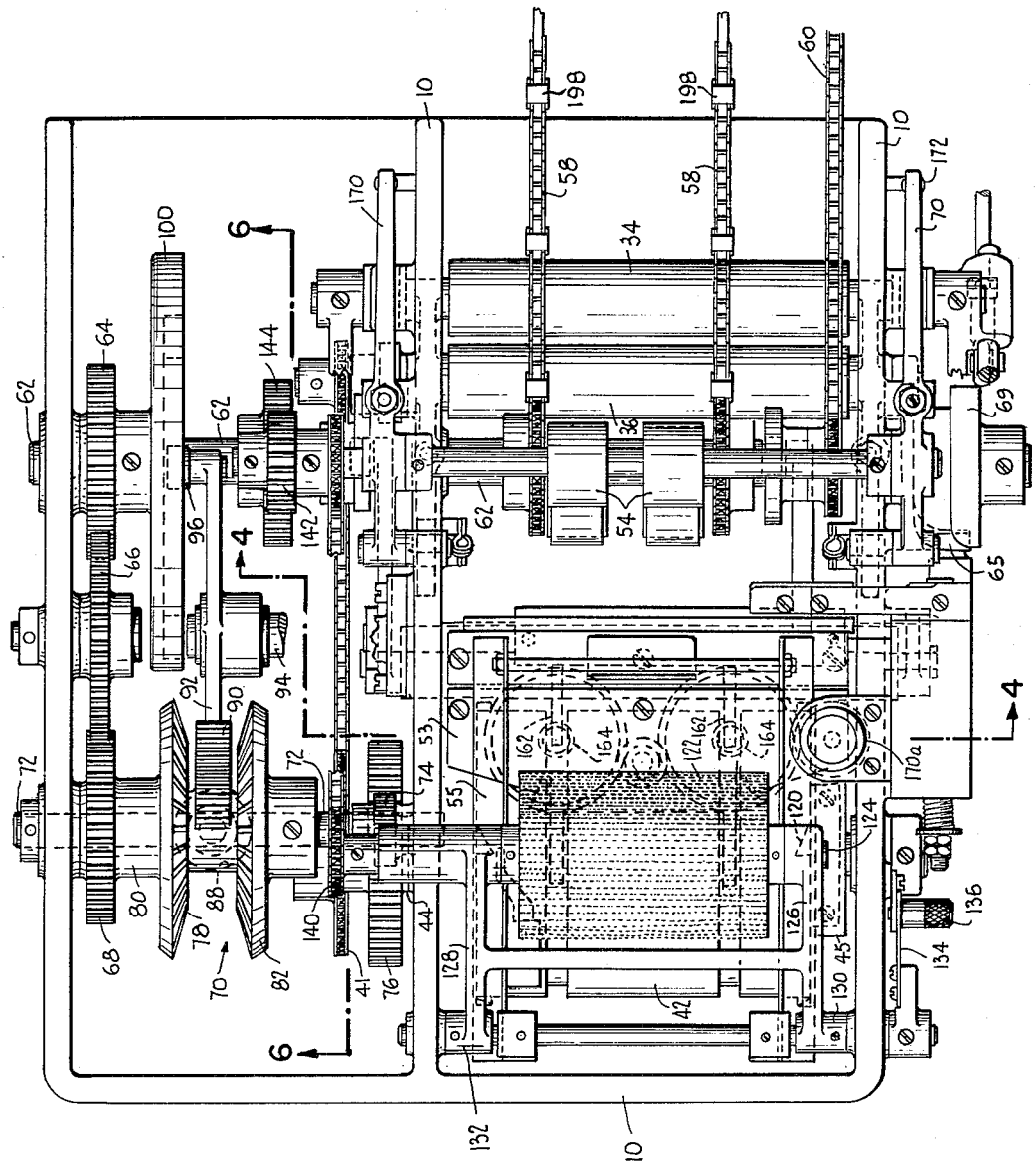
Figure 4:
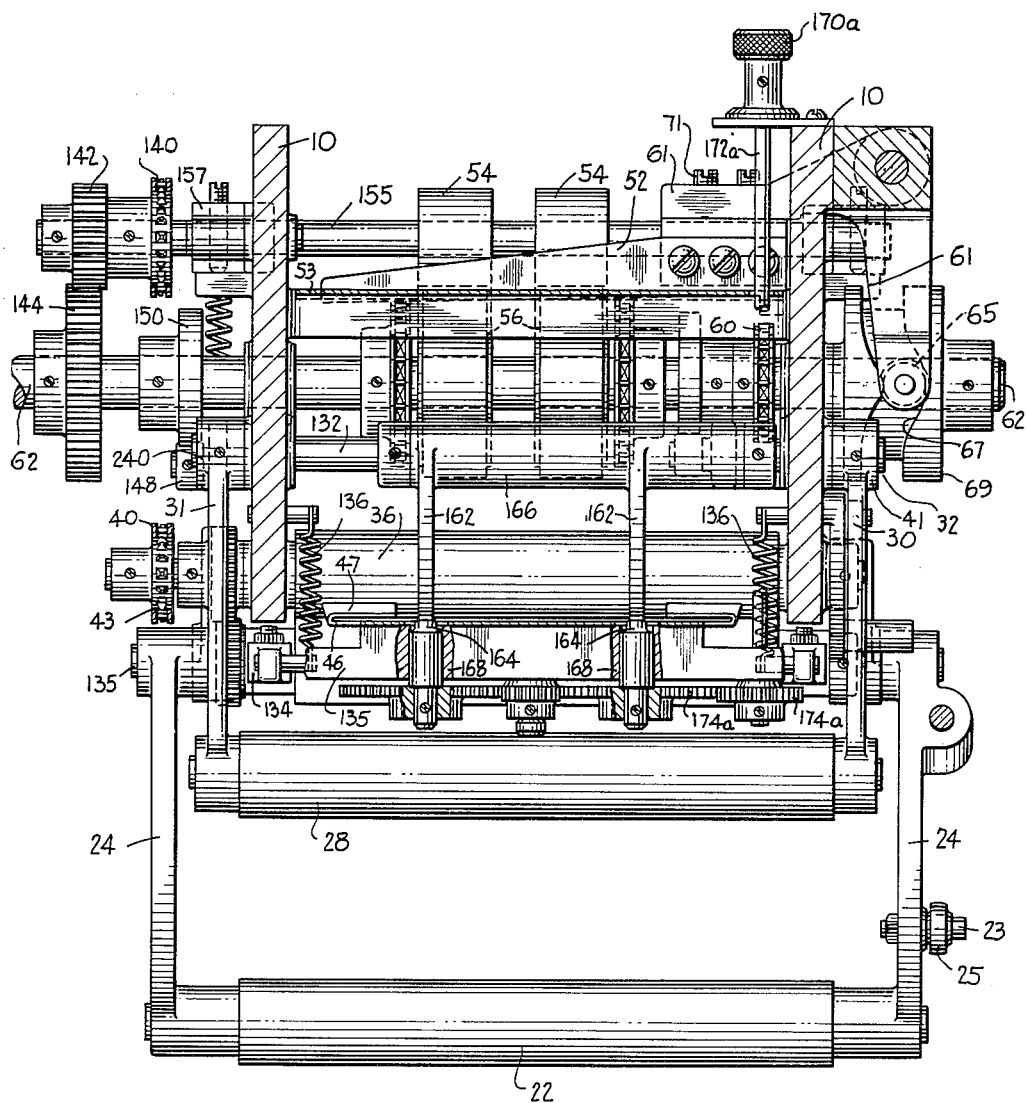
Figure 5:
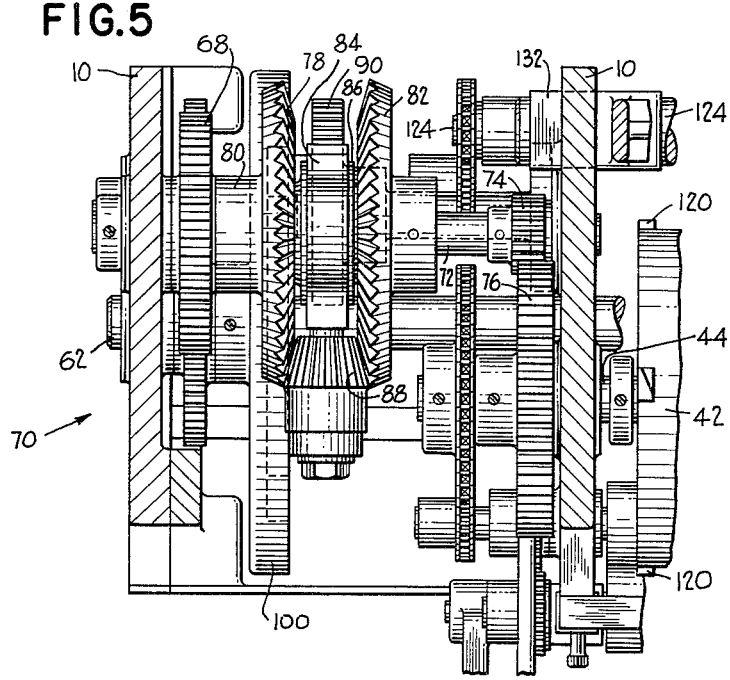
Figure 6:
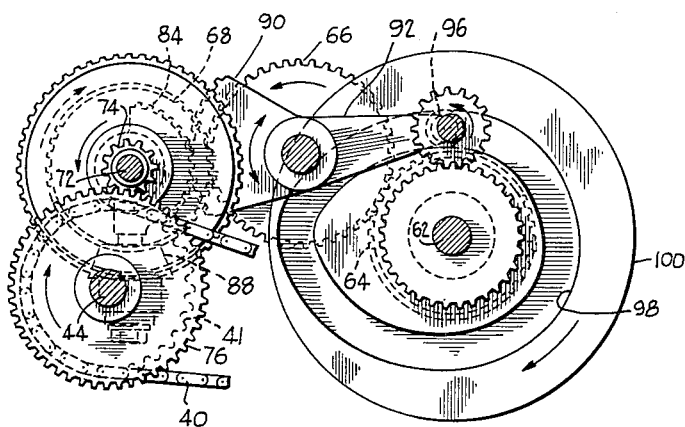
Figure 7:
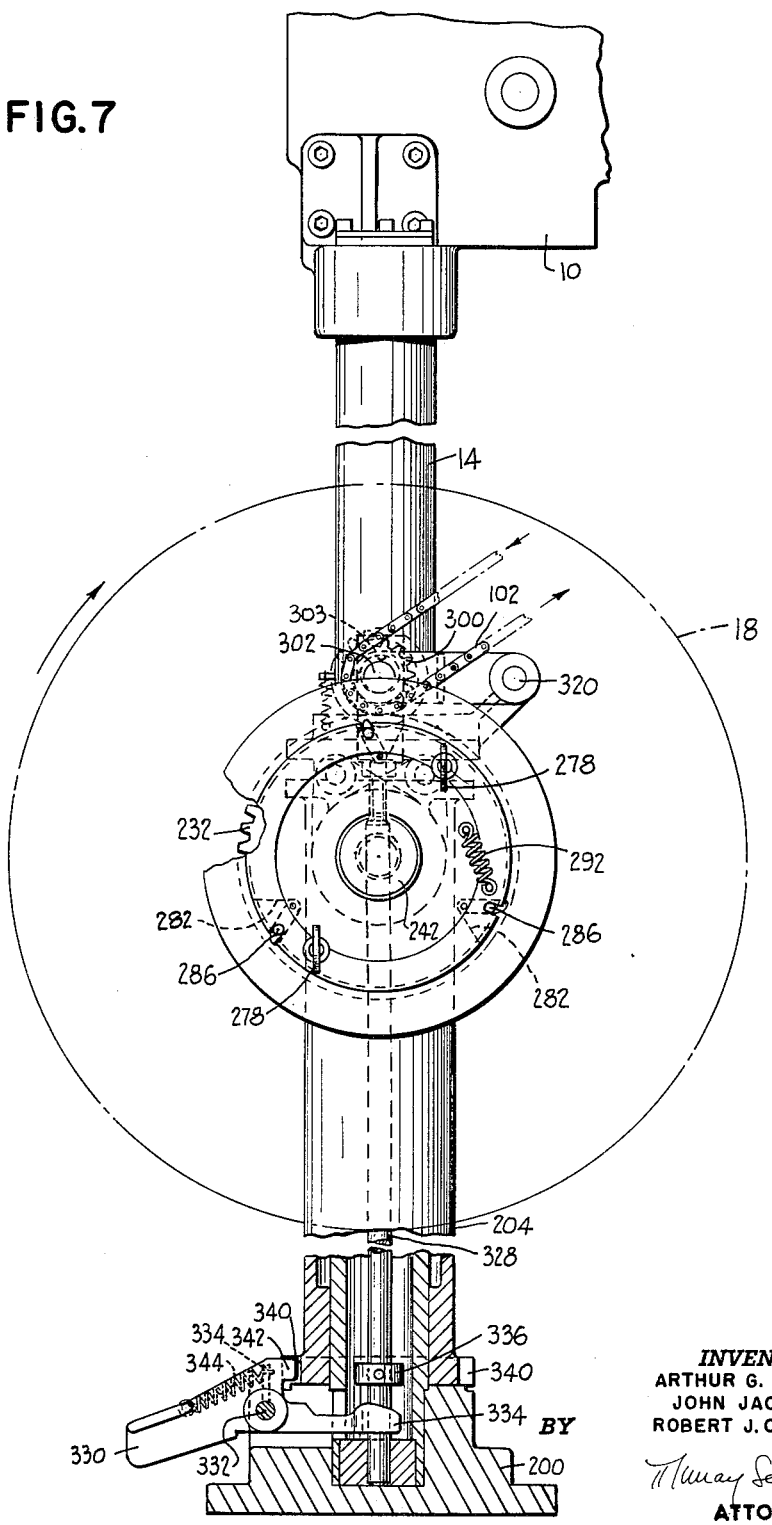
Figure 8:
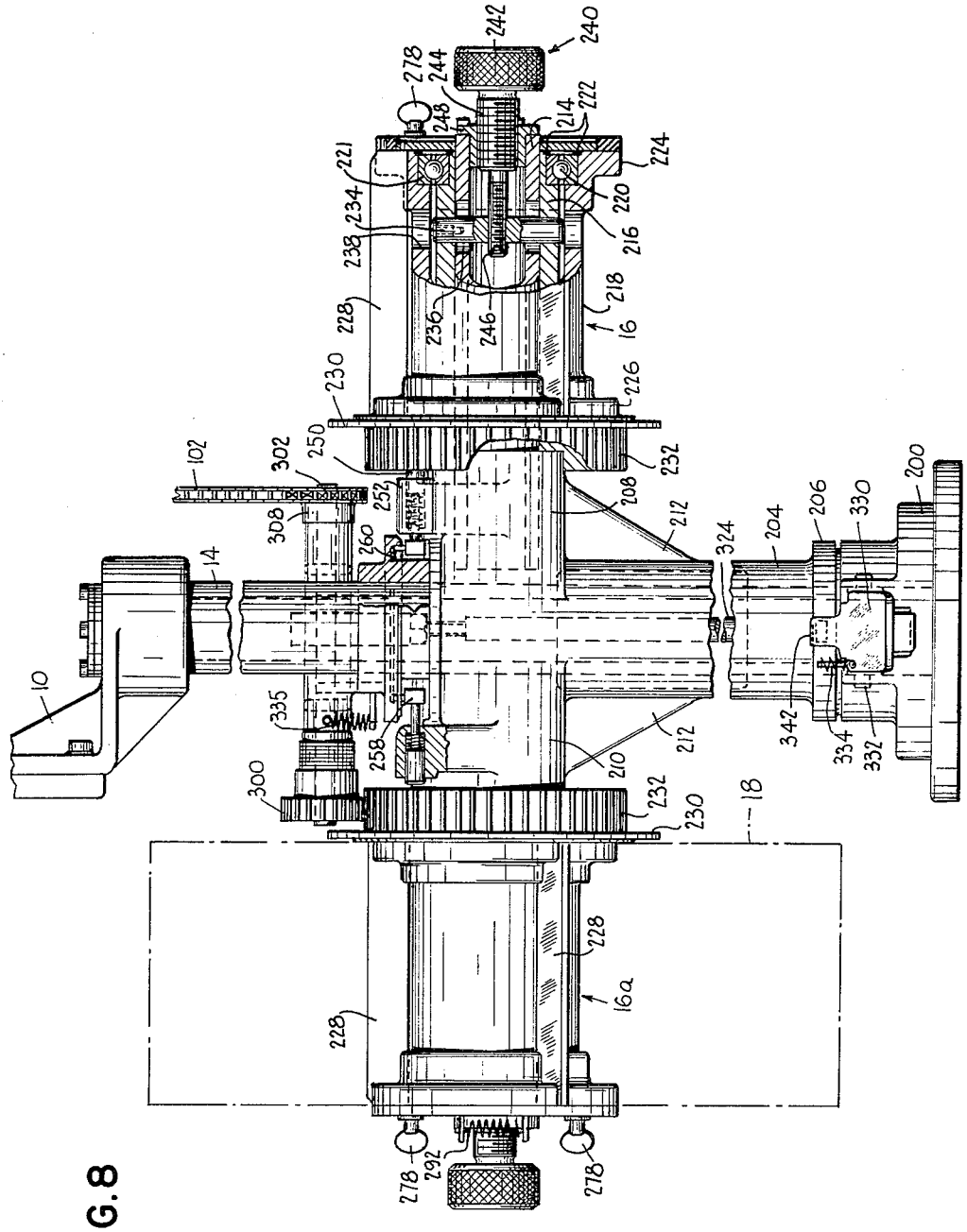
Figure 9:
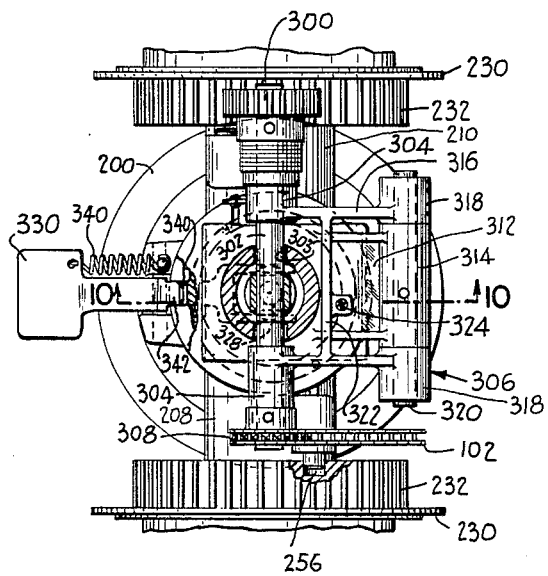
Figure 10:
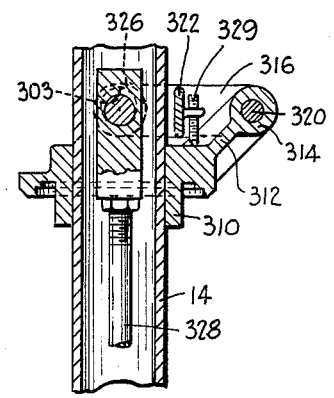
Figure 11:
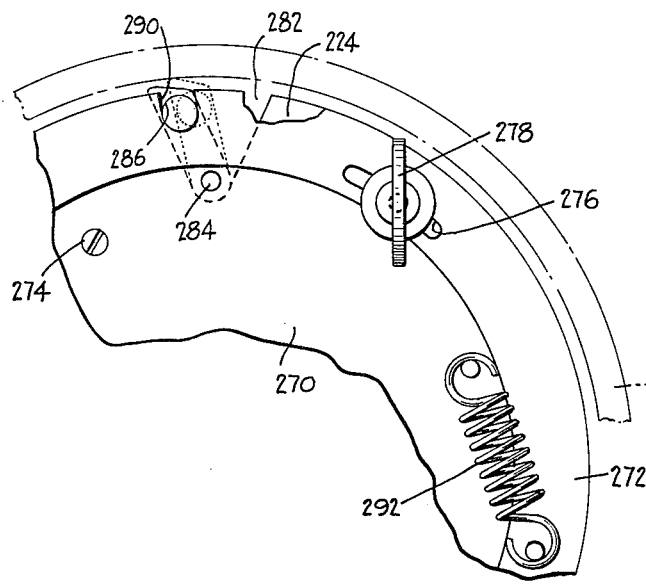
Figure 12:
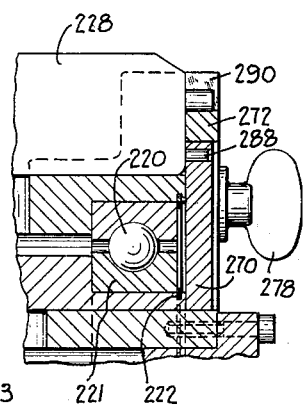

In the following description, reference is made to the accompanying drawings in which;
FIG. 1 is a schematic drawing of the apparatus and method of the present invention,
FIG. 2 is a side elevation of the web feed and cutting mechanism,
FIG. 3 is a plan view of the same,
FIG. 4 is a detailed sectional view of an elevation taken along lines 4—4 of FIG. 3,
FIG. 5 is a front elevation of a section of the apparatus taken along lines 5—5 of FIG. 3,
FIG. 6 is a side elevation of a section of the apparatus taken along lines 6—6 of FIG. 3,
FIG. 7 is a side elevation of the reel mounting and rotating mechanism,
FIG. 8 is a front elevation of same,
FIG. 9 is a partial plan view of same,
FIG. 10 is a sectional side elevation taken along lines 10—10 of FIG. 9.
FIG. 11 is a partial side elevation of the forward end of the spindle shown in FIG. 9, and
FIG. 12 is an enlarged partial section of the forward end of the spindle shown in FIG. 9.

Referring now to FIGS. 1 to 6 of the drawings, the continuous roll label feed mechanism is generally located within a separable framework housing 10 attached directly to the framework 12 of the packing and wrapping machine in a position so that the labels may be severed and fed directly to the machine at the wrapping station thereof. Depending from the framework 10 and extending to the floor or base (not shown) of the wrapping machine, is a post 14 on which is contained at least one horizontal arbor or rotatable shaft 16 (described in greater detail later) on which is rotatably mounted a supply roll 18 of label webbing 20. It will be observed that the overall construction of the appartaus, and in particular the position of the depending post and horizontal arbor, provides convenient and easy means for the mounting of rather large supply rolls of cigarette labels. Since it is contemplated that rolls of webbing 24–28″ in diameter, containing approximately 23,000 to 27,000 labels of standard weight cigarette wrapping paper, will be used with the present apparatus, the ease with which the machine can be set up and prepared for operation is an important consideration.

The webbing 20 is threaded from the supply roll 18 through a path formed by a first idler roller 22, a loop roller 28, a second idler roller 34, a pair of positive feed rollers 36 and 38, guide tube 46 and then about an indexing drum 42. From the indexing drum 42 the web 20 is fed to a cutting station 48 at which the leading label 50 of the web 20 is severed by knife 52. The severed label blank is thence accelerated by roller members 54 and 56 to a chain conveyor 58 and led to the wrapping station (not shown) of the packing machine.

The upper roller 36 of the pair of positive feed rollers 36 and 38 is connected by a drive chain 40 to the indexing drum 42 which is intermittently rotated (as explained in detail later) so that both it and the feed rollers 36 and 38 cooperate to cause the web to be intermittently fed through the horizontal guide tube 46. The indexing drum 42, located on axle 44 mounted in bearings 45 of frame 10, is driven by connection to the central power source of the packing and wrapping machine (not shown) through drive chain 60, shaft 62, gear train 64, 66 and 68, and an intermittent differential gearing system 70 shown in greater detail in FIGS. 5 and 6. The differential gearing system 70 terminates in a shaft 72 having at one end a spur gear 74 intermeshing with gear 76 secured to the axle 44 of the indexing drum 42, and comprises an epicyclic type gear train having a driving bevel gear 78 integrally formed with hub 80 and spur gear 68 (driven by the power source) all of which is freely mounted on shaft 72; a driven bevel gear 82 secured to the shaft; a half circle spur gear 84 having a hub 86 freely mounted about the shaft 72; and a pinion gear 88 engaging with the two beveled gears 78 and 82. The half circle spur gear is oscillatingly driven by a sector gear 90 formed on arm 92 so as to pivot about shaft 94. At the end of arm 92 is mounted a cam follower 96 engaging cam track 98 located in the continuously rotating cam 100 mounted on shaft 62 which rotates, as noted previously, under power derived from drive chain 60.

By following the arrows shown in FIG. 6, the operation of the differential gear system will be clearly observed. Both the bevel gear 78 and the half circle spur gear 84 are continuously but independently driven so that during that period of the oscillation of the half circle gear 84, when it moves in the same direction as the driving bevel gear 78, the pinion 88 acts to transmit motion in the opposite direction to driven bevel gear 82 which in turn rotates shaft 72 and gear 74. During the other portion of the oscillating movement of half circle gear 84, no movement is transmitted to shaft 72. Thus intermittent rotating movement is transmitted to indexing drum 42 to effect its rotation as well as that of the forward feed rollers 36 and 38, which as noted previously is directly connected to it. The gear ratios of the differential system 70, and gear train are such that the drum 42 when rotated is moved through an angle of approximately 90° which, because of the predetermined size of the drum (dependent upon the size cigarette label) will feed one single label blank. The ratio between the sprocket wheels 41 and 43 of the indexing drum 42 and feed roller 36, respectively, is such that when the drum rotates 90° the feed roller 36 makes one complete revolution. It will be realized that the size of the respective parts, as well as the actual movements of the drum and rollers, are dependent upon the size of the label blank. For other than standard size blanks, other relative sizes and movements are required, although the same arrangement as that shown may be easily adapted.

While the forward feed rollers 36 and 38 and the indexing drum 42 are positively driven to feed the web 20, they are insufficient by themselves to effectively and safely draw as well as register an individual blank from a rather large and heavy supply roll. Furthermore, as will be apparent, the feed rollers 36 and 38 and indexing drum 42, are rotated at a constant rate and timing and therefore can not compensate for changes in tension on the web or the size of the supply roll. Therefore, in order to insure the proper drawing of the web and avoid any possibility of tears or misregistration, the arbor 16 carrying the supply roll 18 is driven at a continuously changing speed to compensate for those changes in tension and size of roll noted above. In order to accomplish this, the arbor 16 is connected by a drive chain 102 to the output shaft 104 of a variable control device 106 which in turn has its input shaft 108 connected by appropriate gearing mechanism 110 or other suitable means, to the central power source (not shown). The variable control device 106 contains internal mechanism, controlled by an external arm 112 regulating the speed of its output shaft 104. A suitable variable control device is manufactured by the Zero-Max Company, of Minneapolis, Minnesota, and is known by the trade name "Zero-Max," a detailed description of which is believed unnecessary for an understanding of the present invention. Other similar and suitable devices may of course be used.

As will be obvious from the above discussion, registration and positioning of the label blanks for cutting is provided by cooperative operation of the forward feed rollers 36 and 38 and the indexing drum 42. The drum has a plurality of protruding cogs 120 spaced along its edges approximately 90° apart. These cogs 120 cooperate with a series of notches (not shown) spaced sequentially along the edges of the web 20. The indexing drum 42 and the cutting station 48 are spaced so that, upon the movement of the drum, though approximately 90° apart, one individual blank is advanced in perfect registration for cutting. The notches cause the web 20 to seat firmly on the drum 42 insuring that the leading blank falls into perfect registration at the cutting station 48.

A brush 122 is provided, which cooperates with the indexing drum 42 to exert a slight positive forward pull on the web 20, and to insure that the web 20 passes tightly over the drum 42. The brush 122 is mounted on a rotatable axle 124 within a pair of extending arms 126 and 128 pivotally secured at 130 and 132 to the frame 10. A suitable lever 134 and thumb screw locking arrangement 136 is provided to permit elevation of the brush 122 out of contact with the drum 42 in order to facilitate threading of the web around the drum when necessary. The brush is driven by a drive chain 140 which through gear 142 and 144 is connected to shaft 62.

Forward feed rollers 36 and 38 intermittently driven through connection with the indexing drum 42 are formed with their upper member 36 having a flat surface 130 along a chord subtending an arc of approximately 85° along its circumference, causing the feed rollers to move the web forward only during approximately 275° of its cycle. During the remaining portion of its cycle, the flat of roller 36 is in horizontal dwell position and the web's forward motion is arrested. This occurs simultaneously with the dwell of index drum 42. To insure adequate contact of the rollers during the remainder of the cycle, the bottom roller 38 is positioned on an arm 134 pivoted about axle 135 and held by spring 136. The extent of the feeding by the rollers 36 and 38 allows the web 20 to advance a length slightly greater than one full label blank (in this case approximately 2% greater) which, since the movement of the indexing drum is only to the extent of feeding one full label blank, eliminates any unwanted stress or strain on the web and permits the drum 42 to accurately present the label blank to the cutting station.

The excess feeding of the web 20 is controlled by the web guide 46 which has a height only slightly greater than the paper stock and a funnel shape opening 47. This causes the web to buckle as shown in FIG. 1.

Proper tension is maintained at all times on the web and the excess feeding thereof is taken up by the movement of the loop roller 28. The loop roller 28 is mounted between arms 30 and 31 which are respectively provided with hubs 240 and 241, each of which is secured to the transverse axle 32 which is freely mounted within the framework 10. Hub 240 (on the left in FIG. 4) is provided with a substantially horizontal extending arm 146 having a cam follower 148 at its end engaging camming means 150. Camming means 150 is mounted on shaft 62 which is driven by drive chain 60 attached to the central power source and is thus continuously rotated. The movement of camming means 150 and follower 148 is synchronized to the movement of indexing drum 42 and feed rollers 36 and 38 so that the movement of axle 32 will cause the arms 30 and 31 and loop roller 28 to maintain a constant minimum tension on the web 20 during the forward feeding cycle of the indexing drum 42 and feed rollers 36 and 38 and to pull back, during their dwell, the 2% excess of web fed by the feed rollers. Further, the operation of the loop roller 28 allows the keeping of the supply reel in constant motion.

To preclude the possibility of the web 20 being pulled off the drum 42 or from backing out of registration with the cogs 120, when the loop roller 28 pulls the web back, the web is clamped at 160. The clamping is provided by a pair of depending fingers 162 and cooperating pad means 164 located respectively adjacent the upper and lower surfaces of the web. The clamp fingers 162 are mounted on an elongated hub 166 keyed to axle 32 so that upon rotation of the axle 32 it moves with it. The fingers are located so that just prior to the pull-back of the web by loop roller 28, the fingers are depressed and clamp the web securely. During this short period between the clamping of web by fingers and its pull-back by roller 28, the feed rolls 36 and 38 feed the extra 2% of the web as described above.

The pad means are adjustably mounted within housings 168. Control knob 170a, rod 172a, and gear train 174a, are provided to regulate the height of the pad 164 to accommodate various sizes and grades of paper. The adjustable clamp pads 164 have still another function. By adjusting their height it is possible to advance or retard the position of the web 20 on the drum 42 and thereby further insure proper registration of the web on the drum. For example, the pads 164 when moved upwardly (closer to the clamp fingers 162), the time of clamping, in relation to the registering drum dwell, is advanced, thus retarding the label web. When the pads 164 are moved downwardly (away from clamp fingers 162) the opposite occurs and the web is advanced.

The web tension and size of the web on the reel, both of which determine the speed at which the reel is rotated, is sensed by idler roller 22 and transmitted to the variable drive control 106 in the following manner. The idler roller 22 is mounted between arms 24 which are pivoted on axle 135, so that any tension on the web would cause the arm to move. Also, arms 24 are caused to be moved by the idler roller 22 sensing the size of the roll 18, as a function of the angle formed by the web leaving the roll 18 and the point from which it leaves the roll. The arm 24 is connected at 23 by lever 25 to variable control device control arm 108 thus transmitting its movement to the control arm 108 and thereupon causing the variable control device 106 to alter the speed of rotation of the reel 18. A balance arm 150 and weight 152 are attached to arm 24 to provide proper tension and balance in order to avoid unnecessary effects caused by the oscillation and flapping of the arms 24. It will be observed here that there is no mechanical connection between the variable control apparatus and the other apparatus, except through the web itself. It is the web which communicates the information as to tension, position of the leading blank, and size of the reel, as exemplified by the movements of the feed rollers and loop roll to the variable control device. In response thereof the label roll is driven at a continuously changing rate of speed to compensate for the tension change of the web and the diameter change of the roll as it is run off.

Upon the registration of the web 20 with the leading label thereof coming to rest at the cutting station 48, the knife 52 is actuated, cutting the forward label preferably within the area of the label which is notched. A cutting bar 53 is provided as well as guide rails 55 to insure a perfect cut. The cutting bar 53 is adjustably fastened to the frame 10 so that the clearance between it and the heel of knife 52 may be regulated. The knife 52 is screw mounted on a handle 61 having an arm 63 at the end of which is a roller 65 engaging the track 67 of cam 69. Cam 69 is mounted on shaft 62 and therefore is continuously rotating. The cam 69 is adapted to actuate the knife 52 when drum 42 is at dwell. Screws 71 provide the necessary means for adjusting the squareness and bite of knife 52 with respect to the cutting bar.

The cut label 50 is removed from the cutting station 48, accelerated and transferred to the wrapping and packing machine by means of coacting pairs of rollers 54 and 56 and chain conveyor 58. The upper rollers 54 are keyed to shaft 155 which is mounted in bearing housings 157 located on a pair of arms 170 respectively pivoted to the framework 10. Spur gear 142 is located at an end of shaft 155 and engages gear 144 mounted on shaft 62 so that the roller rotates by connection to the central power source. Brush 122, previously described, can now be seen to be also driven in the same manner. A lever 159 is employed to tension the chain 140 and may be moved to loosen the chain to permit the brush 122 to be moved, as previously described. Spring 172 is biased to depress arm 170 to cause rollers 54 to make positive contact with rollers 56 while screw 174 and plate 175 are provided to adjust the bite between rollers 54 and 56. The lower rollers 56 are further segmented at 176 to allow the web to enter between rollers 54 and 56 during the feeding cycle of drum 42 and to remain at rest during the cut-off of the label. After the cut-off has been completed, the full portion of the segmented roller 56 engages the label 50 with the roller 54 and feeds the label 50 to the conveyor 58 which contains flights 198 by which it is carried to the label feed conveyor of the packing machine (not shown).

In order to insure that the machine does not continue operation when the web is in improper index or registration on the drum 42, or when the web is torn or otherwise in poor condition, a limit switch 180 having a tenacle 181 is mounted adjacent the drum so that the tenacle 181 rests upon the web. The tenacle 181 senses the moving web and should any of the faults occur, causes the switch 180 to close. The switch is adapted to shut off the machine permitting the operator to overcome the difficulty.

It will be recalled that the reels of webbing are mounted on an arbor which is positioned beneath the feed mechanism and is driven in such a manner as to feed the web thereto. In a preferred form of the present invention, the apparatus is provided with a set of two arbors or spindles, one of which may be loaded with a fresh supply of webbing while the other is simultaneously operating with a full reel to feed the web. Dual spindles facilitate the loading of the apparatus and avoids "down" time during which the apparatus is not in operation while permitting the actual loading of the machine at a more leisurely pace, resulting also in less labor effort and fatigue.

The novel structure for the mounting of dual arbors is shown in detail in FIGS. 7–10. Post 14, which as noted previously supports the arbor, is securely set within a base 200 which may itself rest on or be bolted to the floor (not shown). The post 14 extends vertically and may be used as a support for the feed mechanism with its upper end 201 bolted or otherwise securely fastened to framework 10. Mounted for rotatable movement concentrically about post 14 is a hollow cylinder 204 having a flange 206 at its lower end resting upon the upper edge of base 200. The inner diameter of the cylinder 204 is slightly larger than the outer diameter of post 14 to minimize wobbling or unsteadiness. Integrally formed with the cylinder 204 at its upper region are a pair of horizontal arms 208 and 210 extending respectively in opposite directions and to which brackets 212 are joined for strength and support. It will be observed that the arms 208 and 210 which form with cylinder 204 a T shaped brace rotatable about the vertical axis of post 14 which is particularly adaptable for the mounting of dual spindles capable of being alternately rotated for operative to inoperative positions.

In the present embodiment of the invention, both spindles are identical in structure and mounting, except that one is mounted on arm 208 while the other is mounted on arm 210. It is therefore necessary, for a full understanding of this invention, to describe only one. To this end particular reference is made to FIG. 8 where the arbor to the right 16 is drawn in great detail. This arbor 16 is in inoperative position and in unload condition. For further illustration, the arbor to the right 16a is in operative position and is loaded with a full reel of webbing.

Keyed, locked or formed integrally with arm 208 is an extension rod 214 on which is slidably mounted a sleeve 216 about which is further rotatably mounted an outer sleeve 218. Ball rollers 220 seated in appropriate bearings 221 are employed at each end of the sleeves 216 and 218 to permit relative rotation between the sleeves about their horizontal axis. The rollers 220 and their bearings 221 are held by spring clips 222 which in retaining the bearings 221 also prevent the sleeves 216 and 218 from movement in a relative lateral direction. To permit the spindle to carry the reel, the outer sleeve 218 is provided with a pair of shoulders 224 and 226, respectively, at either edge thereof. The sleeve 218 is also provided with fins 228 adapted to clamp the core 283 of a reel (the structure and operation of which will be described in detail later) as well as an annular flange 230 which acts as a stop for the reel 18. Formed integrally with the outer sleeve 218 is sprocket gear 232, which when the arbor is swiveled about post 14 into operative position engages a gear 300 which by a connection to be described in detail later, is driven through chain 102 by the drive mechanism 106 (FIG. 1) so that the spindle rotates as previously described.

Both the inner and outer sleeves 216 and 218 are mounted to slide cooperatively within defined limits on extension sleeve 214. In order to accomplish this, a pin 234 is slip fitted within a hole bored within inner sleeve 216 and simultaneously through a correspondingly slotted channel 236 cut within sleeve 214. An enlarged hole 238 is provided in outer sleeve 218 to facilitate the placement of pin 234. It will be observed that since sleeves 216 and 218 are prevented by spring clips 222 from relative lateral movement, the lateral movement of pin 234 in slot 236 will carry both sleeves 216 and 218 slidingly along a sleeve 214, limited only by the extent of the slot 236 in the latter. The pin 234 at its central portion engages with one end of a double screw stud 240 which consists of a knurled knob 242, a large diameter threaded portion 244, and a small diameter threaded portion 246. The small threaded portion 246 engages with a correspondingly threaded bore in pin 234 while the large threaded portion 244 engages with a correspondingly threaded cap 248 which is secured to the end of sleeve 214. Screw portions 244 and 246 are differentially threaded so as to obtain a variance in the lateral movement of one over the other when generated by the manual actuation of knob 242 so that a lateral movement may be imparted to pin 234 and simultaneously to sleeves 216 and 218 all relative to sleeve 214. The purpose of such movement will be discussed shortly, however, it is now obvious that this arrangement permits the movement of the sleeves 216 and 218 while it insures a stationary placement of the sleeves in any desired position when knob 242 is permitted to come to and remain at rest.

When the arbor 16 is in the position shown in FIG. 8 (i.e. inoperative) it is desirous that means be provided for controlling the rotation of the otherwise freely rotatable arbor. It may be necessary, when loading the arbor with a fresh supply reel, to oscillate or jockey the roll into position, or on the other hand, it may be necessary to keep the arbor from rotating in order to securely fit the reel thereon. It will be remembered that the reels which are to be used in the present apparatus are quite large and heavy, and therefore allowances must be made for all contingencies. To prevent the inoperative spindle from unnecessarily rotating, a spring loaded brake pin 250 mechanism is associated with each. Each brake pin 250 is mounted in a housing 252 on the upper portion of cylinder 204 and is biased by spring 254 to normally extend into engagement with the gear 232. The sprocket gear 232 is provided with a bore 256 which is adapted to receive the pin 250 as shown in FIG. 9. As shown in FIG. 8, each brake pin is provided at its non-engaging end with a cam follower 258 which rides in a substantially circular cam track 260 formed in an annular plate 262 mounted concentrically about post 14 above cylinder 204. The cam track is shaped so that the pin 250 is permitted to engage the receiving bore 256 of sprocket gear 232 when the inoperative spindle is in its loading position (as shown with respect to arbor 16 in FIG. 8) and to retract the pin 250 when the arbor is in operative position (as shown with respect to arbor 16a in FIG. 8). The inoperative arbor 16 will lock almost immediately when it arrives at that position and in any event in no greater time than it takes the arbor 16 to rotate once when at that position.

As previously noted, occasions might arise for wanting, at the inoperative position, a freely rotatable spindle and to this end the ability to slide the sleeves 216 and 218 relative to rod 214 is effective. As sleeve 218 is laterally shoved away from post 14, along the horizontal axis of arm 208 by rotation of knob 242, the sprocket gear 232 disengages from brake pin 250 and the arbor rotates freely. By counter-rotation of knob 242, the arbor may be locked again on brake pin 250.

To securely lock the reel on the arbor after it is loaded, the arbor is provided with means to clamp the inner surface of the reel core 283. This structure may be seen in detail in FIGS. 8, 11, and 12. At the forward end of each arbor there is fastened, to the ends of shoulder 224 of the outer sleeve 218, a pair of concentric annular rings 270 and 272. The inner ring 272 is securely fastened by screws 274 to the shoulder 224 while the outer ring 274 is mounted to rotatably shift about it. The outer ring is formed with a number of slots 276 through which thumb screws 278 extend to bores (not shown) correspondingly threaded in shoulder 224. The shoulder 224 as well as the shoulder 226 (which is at the rearward end of the arbor) is provided with a number of V shaped cut-out portions 280 (FIG. 11). In each of the V shaped cut-out portions 280, lengthwise between the forward and rearward ends of the arbor, is mounted a blade-like fin 282. At the forward end of each spindle, each of the fins 282 is provided with a pair of protruding studs 284 and 286. The lower stud 284 is swivel mounted in a bore 288 located in the inner stationary ring 270. The upper stud 286 rests in a U shaped cut-out portion 290 in the shiftable annular outer ring 272. At the rearward end of the spindle, each of the fins 282 is provided with a similar set of studs, except that at this end only the lower stud is mounted in the same manner, as its corresponding stud at the forward end. At the rearward end, the upper stud may remain uninhibited or mounted in any suitable manner which would permit the free pivoting of the fin 282.

Each of the fins 282 is of such a height that when they are pivoted about the lower studs 284, they extend beyond the circumference of the shoulders 224 and 226. It will be observed, when loading the spindle with a fresh reel, that by loosening the thumb screw 278, and shifting or rotating the reel clockwise, the upper end of at least one fin will engage the inner surface of the core 283, pivot about stud 284 and because all of the fins 282 are connected by the outer ring 272, they will all thereupon clamp the inner surface of the reel core 283. Because each of the fins 282 are mounted in the same way, all will pivot and simultaneously shift the outer ring 272 which when the thumb screws 278 are secured will lock fins 282 in place. A spring 292 is provided to cause the inner and outer rings 272 and 274 to be normally in a position to keep the fins in a retracted unclamping position so that positive action is required to clamp the reel on the arbor. In unloading a spent reel, the reverse procedure is employed.

Once the arbor is fully loaded, it may be left alone until it is ready for use. When its use is required, the fully loaded arbor is swiveled about post 14 into position beneath the feed mechanism as shown by arbor 16a to the left in FIG. 8. Once in operative position, the rotation of the arbor for feeding the web, in accordance with the method and apparatus previously described, is caused by the interlocking of gear 300 (which is connected to the variable drive means 106) with spur gear 232. Gear 300 is located at one end of a shaft 302 extending through slot 303 formed in post 14 and is mounted within a pair of suitable bearings 304. At the other end of shaft 302 is located a sprocket 308 on which chain 102 is fixed. Chain 102 extends to the variable drive mechanism 106 shown in FIGS. 1 and 2.

A hinge mechanism 306 is provided to permit the elevation of gear 300 so that it will disengage from the teeth of spur gear 232 in order that the arbors may easily swivel about the post 14. The hinge mechanism comprises an annular base structure 310 mounted upon the post 14 and resting upon the top edge of the housing for the brake pin cam 260. Extending at an angle from the housing 310 is a pair of arms 312 joined at their ends by a first hinge member 314. Extending from each of bearings 304 is an arm 316 joined at their ends by a second hinge member 318 intermeshing with first hinge member 314. A pin 220 is inserted with members 314 and 318 so that they may cooperatively swing. Between arms 316 is a cross brace 322 on which is located an elongated screw 324. Screw 324 is positioned to rest upon the upper edge of housing 310 and is adjustable to vary the height of gear 300 as it is caused to fall upon spur gear 232. A spring 325 is joined between one of the bearings 304 and the cam housing 260 to cause the gear 300 to normally act to engage spur gear 232.

The vertical movement of gear 300 is caused by mounting about shaft 302 a rectangular block 326, at the end of which is connected an elongated rod 328 depending through the center of post 14 to a pedal 330. The pedal 330 is pivoted about a pin 332, at the base 200 of post 14. Extending from pedal 330 is a forked lever 334 which substantially surrounds rod 328 below a collar 336 fastened to the rod. Upon depression of the pedal 332, the lever 334 engages collar 336 and causes rod 328 to raise and carry with it shaft 304 which swings on hinge mechanism 306. Thus gear 300 can be disengaged from spur gear 232 and the arbors swiveled about the post 14.

In order to insure perfect registration of the arbors when they are swiveled about post 14, the flange 206 of base 200 is provided with two notches 340 spaced 180° apart. Adapted to fit into notches 340 is a projection 342 formed on the pedal 330. Projection 342 engages cut-out 340 when either of the arbors 16 or 16a are in position and prevents the rotary movement of cylinder 204. A spring 344 is provided causing the pedal 330 to act to normally enter the notches 342 and keep the arbors from rotating.

It will thus be seen that the objects set forth above, and those made apparent from the preceding description, are efficiently attained. As various changes may be made in the form, construction and arrangement of the parts herein without departing from the spirit and scope of the invention and without sacrificing any of its advantages, it is to be understood that all matter herein is to be interpreted as illustrative and not in a limiting sense.

We claim:

1. A method of cutting pre-measured label blanks from a substantially endless web and feeding said blanks to a wrapping machine, comprising mounting said web on a rotatable reel, continuously driving said reel to unwind said web, feeding said web from said reel to a cutting station, sequentially registering the leading blank of said web at said cutting station, sequentially severing the leading blank and conveying it to said wrapping machine, continuously sensing web tension and the size of the web on said reel by sensing the change in attitude of said web as it unwinds from said reel and varying the speed at which said reel is driven in response to changes in tension and size of said web.

2. The method according to claim 1 including intermittently feeding said web to the cutting station for registration and severing, and taking up the excess web as it continues to unwind from said reel.

3. Apparatus for cutting pre-measured label blanks from a substantially endless web thereof and feeding said blanks to a wrapping machine, comprising means for rotatably mounting a reel from which said web is fed, means for driving said reel to unwind said web, means feeding the leading blank of said web to a cutting station, means for cutting said pre-measured blanks from said web, means for conveying said cut blanks to said wrapping machine, means for sensing the attitude of and the tension of said web as it unwinds from said reel and means for controlling the speed at which said reel is driven in response to changes in said attitude and said tension.

4. Apparatus for cutting pre-measured label blanks from a substantially endless web and feeding said blanks to a wrapping machine, comprising means for rotatably mounting a reel from which said web is fed, means for driving said reel to unwind said web, a pair coacting feed rollers drawing said web from said reel to a cutting station, means for registering the leading blank of said web at said cutting station, means for cutting said blank and conveying the same to said wrapping machine, said apparatus including an idler roller located between said feed rollers and said reel, said idler roller being adapted to sense changes in tension on said web and changes in size of said web by sensing the take-off angle of said web from said reel, and means responsive to said idler roller for controlling the speed at which said reel is driven.

5. Apparatus for cutting pre-measured label blanks from a substantially endless web and feeding said blanks to a wrapping machine, comprising means for rotatably mounting a reel from which said web is fed, drive means for continuously rotating said reel, a cutting station, a pair of coacting feed rollers drawing said web to said cutting station, indexing means coacting with said feed rollers to sequentially register the leading pre-measured blank at said cutting station, means for sequentially severing said pre-measured blank and forwarding the same to said wrapping machine, an idler roller mounted between said reel and said feed rollers to sense changes in tension of said web and size of said web by sensing the take-off angle of said web from said reel and means connected to said idler roller for controlling said drive means to vary the speed of rotation of said reel.

6. Apparatus for cutting pre-measured label blanks from a substantially endless web and feeding said blanks to a wrapping machine, comprising means for rotatably mounting a reel from which said web is fed, drive means for continuously rotating said reel, a cutting station, a pair of coacting feed rollers adapted to intermittently feed said web to said cutting station, indexing means coacting with said feed rollers to sequentially register the leading pre-measured blank at said cutting station, means for taking up the excess web fed from said reel when leading blank is registered at said cutting station, means for severing said pre-measured blank and forward said blank to said wrapping machine, an idler roller mounted between said reel and said feed rollers to sense changes in tension and size of said web by sensing the take-off angle of said web from said reel and means connected to said idler roller for controlling said drive means to vary to the speed of rotation of said reel in response thereto.

7. Apparatus according to claim 6 wherein said indexing means comprises a rotatable drum having a plurality of spaced cogs adapted to co-operatively engage spaced cut-outs in said web.

8. Apparatus according to claim 7 including a pair of web clamp fingers adapted to brake the forward movement of said web when said leading blank is in registered position.

References Cited by the Examiner

UNITED STATES PATENTS

| | | | |
|---|---|---|---|
| 922,931 | 5/09 | Marx | 83—369 |
| 1,108,353 | 8/14 | Foster | 83—369 |
| 1,706,165 | 3/29 | Hull | 242—75.51 |
| 1,791,144 | 2/31 | Ranney et al. | 83—423 X |
| 1,860,691 | 5/32 | Richard | 83—209 |
| 1,951,844 | 3/34 | Rose | 83—209 |
| 1,956,474 | 4/34 | Richard | 83—209 |
| 2,288,350 | 6/42 | Gollwitzer | 242—56 |
| 2,300,569 | 11/42 | Hayssen | 83—209 |
| 2,345,656 | 4/44 | Calleson et al. | 226—44 |
| 2,549,912 | 4/51 | Lindsay | 242—64 |
| 2,585,859 | 2/52 | Showalter | 242—64 |
| 2,742,087 | 4/56 | Smith et al. | 83—209 |
| 2,918,971 | 12/59 | Bertram | 83—209 |

ANDREW R. JUHASZ, *Primary Examiner.*

LEON PEAR, *Examiner.*